US008565536B2

(12) United States Patent
Liu (10) Patent No.: US 8,565,536 B2
(45) Date of Patent: Oct. 22, 2013

(54) MATERIAL RECOGNITION FROM AN IMAGE

(75) Inventor: Ce Liu, Belmont, MA (US)

(73) Assignee: Microsoft Corporation, Redmond, WA (US)

( * ) Notice: Subject to any disclaimer, the term of this patent is extended or adjusted under 35 U.S.C. 154(b) by 435 days.

(21) Appl. No.: 12/752,960

(22) Filed: Apr. 1, 2010

(65) Prior Publication Data

US 2011/0243450 A1    Oct. 6, 2011

(51) Int. Cl.
G06K 9/62    (2006.01)

(52) U.S. Cl.
USPC ........................................................ 382/224

(58) Field of Classification Search
USPC ................................................. 382/224–228
See application file for complete search history.

(56) References Cited

U.S. PATENT DOCUMENTS

| | | | | |
|---|---|---|---|---|
| 5,794,788 A * | 8/1998 | Massen | | 209/524 |
| 6,140,643 A * | 10/2000 | Brown et al. | | 850/10 |
| 6,711,293 B1 | 3/2004 | Lowe | | |
| 7,519,200 B2 | 4/2009 | Gokturk | | |
| 7,706,918 B2 * | 4/2010 | Sato et al. | | 700/245 |
| 8,194,953 B2 * | 6/2012 | Xie et al. | | 382/128 |
| 8,218,913 B1 * | 7/2012 | Thirthala et al. | | 382/317 |
| 2004/0213459 A1 * | 10/2004 | Ishimaru et al. | | 382/191 |
| 2005/0036690 A1 | 2/2005 | Zhou | | |
| 2006/0133650 A1 * | 6/2006 | Xie et al. | | 382/108 |
| 2007/0091320 A1 * | 4/2007 | Hu et al. | | 356/604 |
| 2007/0133866 A1 * | 6/2007 | Chang et al. | | 382/159 |
| 2008/0075361 A1 | 3/2008 | Winn | | |
| 2009/0208106 A1 * | 8/2009 | Dunlop et al. | | 382/173 |
| 2009/0304280 A1 | 12/2009 | Aharoni | | |
| 2011/0182477 A1 * | 7/2011 | Tamrakar et al. | | 382/110 |
| 2011/0243450 A1 * | 10/2011 | Liu | | 382/190 |

OTHER PUBLICATIONS

Quelhas et al., "Natural Scene Image Modeling using Color and Texture Visterms", 2006.*
Liu, C. et al.; "Exploring Features in a Bayesian Framework for Material Recognition"; IEEE Conference on Computer Vision and Pattern Recognition; Jun. 13-18, 2010; pp. 239-246.
Unsupervised Modeling and Recognition of Object Categories with Combination of Visual Contents and Geometric Similarity Links—Published Date: Oct. 2008 http://www.ri.cmu.edu/pub_files/pub4/kim_gunhee_2008_4/kim_gunhee_2008_4.pdf.
Hyperfeatures—Multilevel Local Coding for Visual Recognition—Published Date: 2006 http://research.microsoft.com/pubs/67831/agarwal-triggs-eccv06.pdf.
Object Perception as Bayesian Inference—Published Date: Apr. 2004 http://gandalf.psych.umn.edu/users/kersten/kersten-lab/papers/ObjectBayes11.pdf.

(Continued)

Primary Examiner — Aaron W Carter (57) ABSTRACT

A method of operating a computer system to perform material recognition based on multiple features extracted from an image is described. A combination of low-level features extracted directly from the image and multiple novel mid-level features extracted from transformed versions of the image are selected and used to assign a material category to a single image. The novel mid-level features include non-reflectance based features such as the micro-texture features micro jet and micro-SIFT and the shape feature curvature, and reflectance-based features including edge slice and edge ribbon. An augmented Latent Dirichlet Allocation (LDA) model is provided as an exemplary Bayesian framework for selecting a subset of features useful for material recognition of objects in an image.

15 Claims, 9 Drawing Sheets

(56) References Cited

OTHER PUBLICATIONS

Object Recognition with Informative Features and Linear Classification—Published Date: Oct. 16, 2003 http://www.csd.uwo.ca/courses/CS840a/Papers/vidalICCV2003.pdf.
Modeling Annotated Data—Published Date: 2003 http://www.cs.princeton.edu/~blei/papers/BleiJordan2003.pdf.
Estimating Surface Reflectance Properties from Images under Unknown Illumination—Published Date: 2001 http://web.mit.edu/persci/people/adelson/pub_pdfs/dror_spie_01.pdf.
Residual Analysis for Feature Detection—Published Date: Jan. 1991 http://ieeexplore.ieee.org/stamp/stamp.jsp?arnumber=00067628.
Latent Dirichlet Allocation http://www.cs.princeton.edu/~blei/papers/BleiNgJordan2003.pdf.
Bae, S. et al.; "Two-Scale Tone Management for Photographic Look"; Proceedings of ACM SIGGRAPH 2006; vol. 25, Issue 3; Jul. 2006; pp. 637-645.
Belongie, S. et al.; "Shape Matching and Object Recognition Using Shape Contexts"; IEEE Transactions on Pattern Analysis and Machine Intelligence; vol. 24, No. 24; Apr. 2002; pp. 509-522.
Canny, J.; "A Computational Approach to Edge Detection"; IEEE Transactions on Pattern Analysis and Machine Intelligence; vol. PAMI-8, No. 6; Nov. 1986; pp. 679-698.
Caputo, B. et al.; "Class-specific Material Categorisation"; Proceedings of the Tenth IEEE International Conference on Computer Vision; vol. 2; 2005; pp. 1597-1604.
Cula, O, et al.; "Bidirectional Imaging and Modeling of Skin Texture"; IEEE Transactions on Biomedical Engineering; vol. 51, Issue 12; Dec. 2004; pp. 2148-2159.
Cula, O. et al.; "Recognition Methods for 3D Textured Surfaces"; Proceedings of SPIE Conference on Human Vision and Electronic Imaging VI; San Jose, CA; Jan. 2001; 14 pages.
Dalal, N. et al.; "Histograms of Oriented Gradients for Human Detection"; Proceedings of the 2005 IEEE Computer Society Conference on Computer Vision and Pattern Recognition; vol. 1; 2005; pp. 886-893.
Dana, K. et al.; "Histogram Model for 3D Textures"; Proceedings of IEEE Computer Society Conference on Computer Vision and Pattern Recognition; Jun. 23-25, 1998; pp. 618-624.
Dana, K. et al.; "Reflectance and Texture of Real World Surfaces"; ACM Transactions on Graphics; vol. 18, No. 1; Jan. 1999; pp. 1-34.
Debevec, P. et al.; "Acquiring the Reflectance Field of a Human Face"; Proceedings of the 27th Annual Conference on Computer Graphics and Interactive Techniques; 2000; pp. 145-156.
Dror,, R. et al.; "Recognition of Surface Reflectance Properties from a Single Image under Unknown Real-world Illumination"; Proceedings of the IEEE Workshop on Identifying Objects Across Variations in Lighting; Dec. 2001; Kauai, Hawaii; 8 pages.
Durand, F. et al.; "Fast Bilateral Filtering for the Display of High-dynamic-range Images"; Proceedings of the 29th Annual Conference on Computer Graphics and Interactive Techniques; 2002; pp. 257-266.
Fei-Fei, L. et al.; "A Bayesian Hierarchical Model for Learning Natural Scene Categories"; CVPR; 2005; pp. 524-531.
Forsyth, D. et al.; "Automatic Detection of Human Nudes"; International Journal of Computer Vision; vol. 32, Issue 1; Aug. 1, 1999; pp. 63-77.
Fritz, M. et al.; "An Additive Latent Feature Model for Transparent Object Recognition"; Proceedings of the 23rd Annual Conference on Neural Information Processing Systems; Dec. 2009; Vancouver, Canada; 9 pages.
Jensen, H. et al.; "A Practical Model for Subsurface Light Transport"; Proceedings of the 28th Annual Conference on Computer Graphics and Interactive Techniques; 2001; pp. 511-518.
Koenderink, J. et al.; "Representation of Local Geometry in the Visual System"; Biological Cybernetics; vol. 55; 1987; pp. 367-375.
Leung, T. et al.; "Representing and Recognizing the Visual Appearance of Materials Using Three-Dimensional Textons"; International Journal of Computer Vision; vol. 43, No. 1; 2001; pp. 29-44.
Liu, C. et al.; "Nonparametric Scene Parsing: Label Transfer via Dense Scene Alignment"; IEEE Conference on Computer Vision and Pattern Recognition; Jun. 20-25, 2009; pp. 1972-1979.
Liu, F. et al.; "Periodicity, Directionality and Randomness: Wold Features for Image Modeling and Retrieval"; IEEE Transactions on PAMI; vol. 18, No. 7; Jul. 7, 1996; pp. 722-733.
Lowe, D.; "Distinctive Image-Features from Scale-Invariant Keypoints"; International Journal of Computer Vision; vol. 60, Issue 2; Nov. 2004; pp. 91-110.
Marschner, S. et al.; "Image-based BRDF Measurement Including Human Skin"; Proceedings of Rendering Techniques; 1999; pp. 131-144.
Marschner, S. et al.; "Measuring and Modeling the Appearance of Finished Wood"; Proceedings of ACM SIGGRAPH '05; vol. 24, Issue 3, Jul. 2005; pp. 727-734.
McHenry, K. et al.; "A Geodesic Active Contour Framework for Finding Glass"; Proceedings of the IEEE Computer Society Conference on Computer Vision and Pattern Recognition; vol. 1; 2006; pp. 1038-1044.
Nicodemus, F.; "Directional Reflectance and Emissivity of an Opaque Surface"; Applied Optics; vol. 4, Issue 7; 1965; p. 767.
Nishida, S. et al.; Use of image-based information in judgments of surface reflectance properties; Journal of the Optical Society of America, vol. 15, No. 12; Dec. 1998; pp. 2951-2965.
Pont, S. et al.; "Bidirectional Texture Contrast Function"; International Journal of Computer Vision; vol. 62, Issue 1-2; Apr.-May 2005; pp. 17-34.
Sharan, L. et al; "Image Statistics for Surface Reflectance Perception"; Mournal of the Optical Society of America; vol. 25, No. 4; Apr. 2008; pp. 846-865.
Sharan, L., et al.; "Material Perception: What Can You See in a Brief Glance?"; Massachusetts Institute of Technology; Journal of Vision; vol. 9, No. 8; Aug. 5, 2009; 14 pages.
Varma, M. et al.; "A Statistical Approach to Texture Classification from Single Images"; International Journal of Computer Vision; vol. 62, No. 1-2; Apr. 2005; pp. 61-81.
Varma, M. et al.; "A Statistical Approach to Material Classification using Image Patch Exemplars"; IEEE Pattern Analysis and Machine Intelligence; vol. 31, No. 11, Apr. 2006; pp. 2032-2047.
Caputo, "Classifying Materials in the Real World", Image and Vision Computing, Jan. 2010.
Liu, "Material Recognition from an Image", U.S. Appl. No. 13/929,651, filed Jun. 27, 2013.

\* cited by examiner

MATERIAL RECOGNITION FROM AN IMAGE

BACKGROUND

Material recognition is an important aspect of visual recognition. The problem of recognizing materials from photographs has been addressed primarily in the context of reflectance estimation from a surface of an object in the photograph. The visual appearance of a surface of an object depends on several factors including illumination conditions, the geometric structure of the surface sampled at several spatial scales, and the surface reflectance properties, often characterized by the bidirectional reflectance distribution function (BRDF) and its variants. Parameters in a BRDF model are typically estimated from a set of photographs using restrictive assumptions about the illumination, geometry, and material properties.

BRDF estimation is used for both computer graphics rendering and for object recognition. In computer graphics, programmers often try to capture the appearance of real world materials. The visual appearance of materials like wood and skin has been modeled in terms of their estimated BRDF by measuring the distribution of reflected light when incoming light strikes an object at different angles. For example, for shiny surfaces, the incoming light diffuses less along the surface than for surfaces having a dull characteristic. Multiple measurements may be used to estimate the BRDF directly from objects using calibrated cameras and light sources placed at different incident angles.

Recognizing high-level material categories in images is distinct from the well-studied problem of object recognition. Though object identity is sometimes predictive of material category, a given class of objects can be made of different materials (e.g., cups can be made of glass, plastic, paper, etc.) and different classes of objects can be made of the same material (e.g., trees, furniture, houses, etc., can all be made of wood). Therefore, many recent advances in object recognition such as shape context, object detectors, and label transfer may not be applicable for material recognition. In fact, most object recognition systems rely on material-invariant features and tend to ignore material information altogether.

Related, but distinct from material recognition, is texture recognition. Texture is often defined in terms of dimensions such as periodicity, orientedness, and randomness. Although texture can be an important component of material appearance (e.g., wood tends to have textures distinct from those of polished metal), surfaces made of different materials can share the same texture patterns.

SUMMARY

The Applicant has recognized and appreciated that material recognition from a single image may be realized by assigning a material category to an image based on multiple features extracted from the image. In many instances, reflectance-based measures alone may be insufficient for correctly assigning a material category to objects in an image (e.g., objects with translucent surfaces may be plastic, wax, or glass).

Accordingly, some embodiments use a combination of low-level and mid-level reflectance-based and non-reflectance based features to characterize various aspects of material appearance. For example, in addition to several previously developed low-level features such as color, jet, and scale-invariant feature transform (SIFT), some embodiments describe novel mid-level features including the non-reflectance based features micro-jet, micro-SIFT, curvature of edges, and the reflectance-based features edge slice, and edge ribbon that may be useful individually, or in combination with low-level features for material recognition.

Some embodiments are directed to a method of categorizing a material of an object in an image. The method comprises extracting, with at least one processor, a plurality of features from the image; combining at least two of the plurality of features to generate a model comprising distributions for the at least two of the plurality of features across groups of pixels in the image; and categorizing the material of the object in the image based, at least in part, on the distributions in the model.

Some embodiments are directed to a computer-readable storage medium encoded with a plurality of instructions that, when executed by a computer, perform a method. The method comprises extracting at least one reflectance-based feature and at least one non-reflectance based feature from an image; and categorizing a material in the image based, at least in part, on the at least one reflectance-based feature and the at least one non-reflectance based feature.

Some embodiments are directed to a computer system, comprising at least one processor programmed to: extract a plurality of features from a plurality of images assigned to a plurality of material categories, wherein the plurality of features comprises at least one reflectance-based feature and at least one non-reflectance based feature; and select a subset of the plurality of features, wherein the subset of the plurality of features is determined by a learning procedure in which combinations of features are analyzed to determine the subset of the plurality of features.

The foregoing is a non-limiting summary, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Determining a high-level material category (e.g., glass, wood, plastic, etc.) for an object in a single image is generally not possible using BDRF estimation as described above. Even with restrictive assumptions about illumination, geometry, and material properties, a set of photographs of the object is typically still required to generate a robust BRDF model which may be used to infer a material category.

Figure 1:
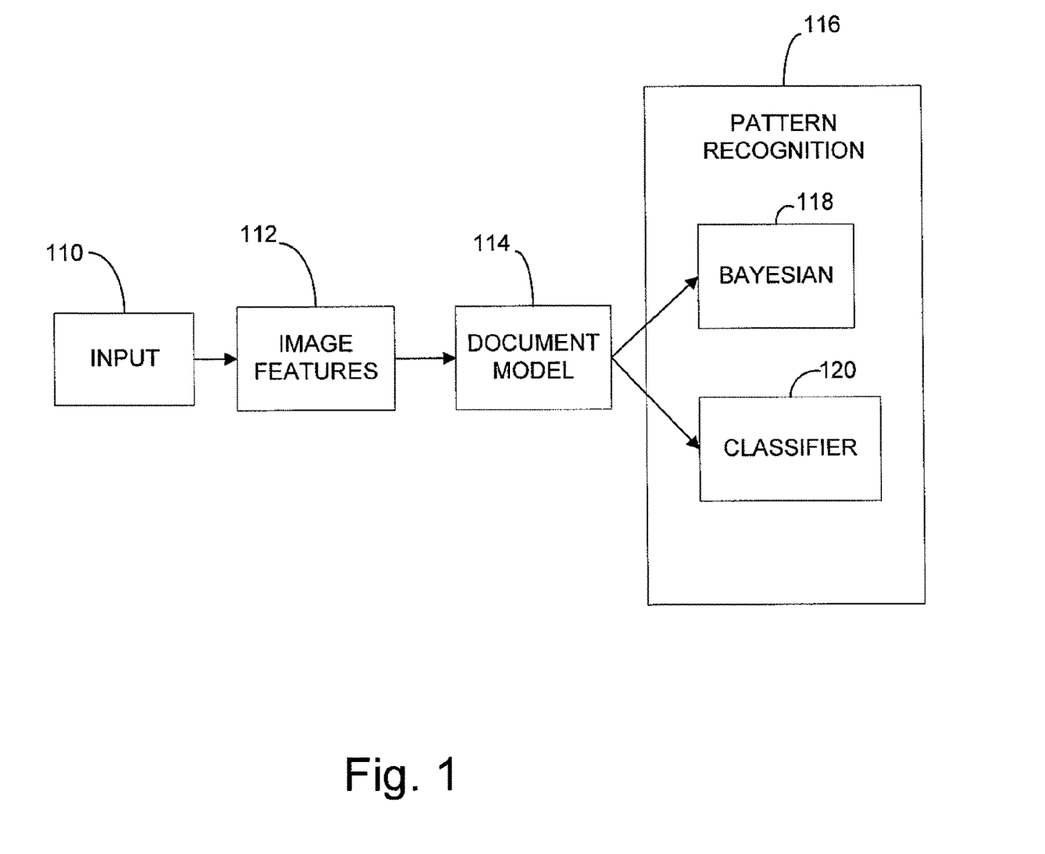
FIG. 1 is a high-level diagram of a prior art image processing technique used in visual recognition.

Some visual recognition systems are based on an appearance model in which underlying physical properties are immaterial to the recognition process. Such visual recognition systems, including object-, scene-, and texture-recognition systems, may employ a recognition technique similar to that illustrated in FIG. 1. The conventional visual recognition processing technique shown in FIG. 1, is further explained below in the context of an object-recognition system.

In act 110, the object-recognition system receives input. For example, the input may be an image of a ball used in sporting events, and the object-recognition system may be tasked with determining what type of ball is in the image. Prior to extracting features from the input image, the image may be cropped such that the object depicted in the image is the focus of the image. By cropping the image to focus on the ball, segmentation of the image to identify a particular object of interest in the image may be avoided. In act 112, one or more image features may be extracted from the image to facilitate object recognition of the ball in the image. For example, low-level features such as color, shape, and texture of the object may be determined using one or more feature detection techniques.

After feature extraction in act 112, the object-recognition system may attempt to classify the object based on the extracted features by quantizing the extracted features to form a document model in act 114. Feature quantization, (e.g., "clustering") is a technique for grouping data with similar characteristics to facilitate a statistical analysis of the data. For example, an input image may be analyzed to determine the color of the object in the image. Each pixel in the image may be assigned an RGB color value and a large number of pixels (e.g., 100,000 pixels) may be sampled. The large number of sampled RGB pixel values may be quantized by assigning a label to each pixel in the image representing the "prototype" cluster to which the pixel is most closely associated in the RGB feature space. For example, each of the pixels in the image may be quantized by assigning a label associated with one of 200 prototype color clusters. The result is an image "document model" in which the image can be represented by a distribution of the prototype cluster values across all pixels in the image.

Such document models are sometimes referred to as "bag-of-words" models based on their common usage in natural language processing and information retrieval. In such a model, text in a document is represented as an unordered collection of words chosen from a dictionary of words. In the image processing corollary of bag-of-words models the "dictionary of words" for a feature is the set of all quantized prototypes, where each prototype corresponds to a "word" in the dictionary. Words in image processing bag-of-words models are often referred to as codewords and dictionaries as codebooks.

After a document model has been created for the input image in act 116, pattern recognition is used classify the image based on the document model generated in act 114. Any suitable pattern recognition algorithm may be used to classify the object in the image including, but not limited to, Bayesian models 118 and other classification algorithms 120 such as support vector machine algorithms, nearest neighbor algorithms, and boosting algorithms. A further discussion of a novel Bayesian approach for modeling distributions of multiple features for classifying a material in an image in accordance with some embodiments of the invention is discussed in more detail below.

Although the visual recognition technique illustrated in FIG. 1 has been used for object-, scene-, and texture-recognition processing, conventional material recognition techniques do not use this visual recognition technique because the features typically extracted in such systems are material-invariant and tend to ignore material information altogether. As described above, conventional material recognition techniques typically infer an object's material category based on multiple reflectance measurements captured through a single reflectance-based feature called the BRDF. However, in situations where multiple pictures of the same object are not available, a robust BRDF may not be obtainable without restrictive assumptions.

The Applicant has recognized that the visual recognition technique shown in FIG. 1 may be modified and used to determine a material category for an object in a single image. That is, rather than assigning a material category based on a single reflectance-based BRDF measure, some embodiments of the invention consider a combination of low-level (e.g., color, texture) and novel mid-level non-reflectance based and reflectance-based features extracted from an image to determine a material category for the image. In contrast to low-level features which are extracted directly from an original image, novel mid-level features described herein are extracted from processed versions of the original image. For example, mid-level features may be extracted from an input image that has been filtered and/or has been subjected to an edge-detection algorithm.

Typical techniques for describing low-level features used in object- and scene-recognition are color assignment (e.g., based on an RGB color model), jet, and SIFT. Color is an important attribute of surfaces and may be a useful cue for material recognition. For example, wooden objects tend to be brown, leaves tend to be green, fabrics and plastics tend to be saturated with vivid color, and stone tends to be less saturated. In accordance with some embodiments of the invention, groups of pixels or "patches" of a fixed size (e.g., 3×3) may be analyzed from an input image to determine a color feature in a feature extraction step (e.g., step 112 in FIG. 1).

Texture is another low-level feature that may be useful for material recognition. For example, wood and stone are generally associated with characteristic textures (e.g., smooth vs. rough) that may help distinguish the materials. In some embodiments, texture features are extracted from an image using at least two techniques to produce different texture-feature sets. A first technique called jet is created by applying a set of multi-scale, multi-orientation filters (e.g., Gabor filters) to an image and examining the resulting filter responses. It should be noted that filters, as described in this context, are mathematical operations applied to an image using, for example, a computer processor programmed to perform the operations. Jet features may be useful in recognizing three-dimensional textures by clustering the filter responses to produce line orientation vectors indicative of a texture in the image. A second texture-based technique called scale-invariant feature transform (SIFT), the method of which is described in U.S. Pat. No. 6,711,293, has been used extensively in scene- and object-recognition to characterize the spatial and orientation distribution of local gradients in a image.

As described above, the Applicant has recognized and appreciated that material recognition from an image may be improved by using a combination of previously-described low-level features (e.g., color, texture) and novel mid-level features. In particular, mid-level techniques for extracting novel non-reflectance based features such as micro-texture and edge contour shape, and reflectance-based features in accordance with some embodiments of the invention are now described.

Texture, as described above, may be a useful feature for material recognition. However, the Applicant has appreciated that although low-level techniques for describing texture such as jet and SIFT have been useful in object- and scene-recognition, additional novel mid-level texture-based features that describe the micro-surface of images may also be useful in material recognition. Accordingly, some embodiments of the invention relate to novel mid-level techniques for extracting micro-texture features that relate to the surface structure of images as illustrated in FIG. 2.

In order to extract information about surface structure, an input image may first be smoothed by applying a filter to the input image in act 202. One such filtering technique is bilateral filtering, which replaces pixel values in an image with an average of similar and nearby pixel values to smooth the image while preserving edges in the image. Bilateral filtering is often used in digital image processing to remove texture information from an image, thereby reducing the size of the corresponding image data file without loss of overall shape features in the image. In such applications, the residual local texture information of the image is usually discarded in favor of the filtered "base" image that has been smoothed to eliminate the texture features. However, the Applicant has recognized that the residual image that includes the local texture features, rather than being discarded as a byproduct of bilateral filtering, may be used to characterize the micro-texture features of the image that may be useful in material recognition.

Figure 2:
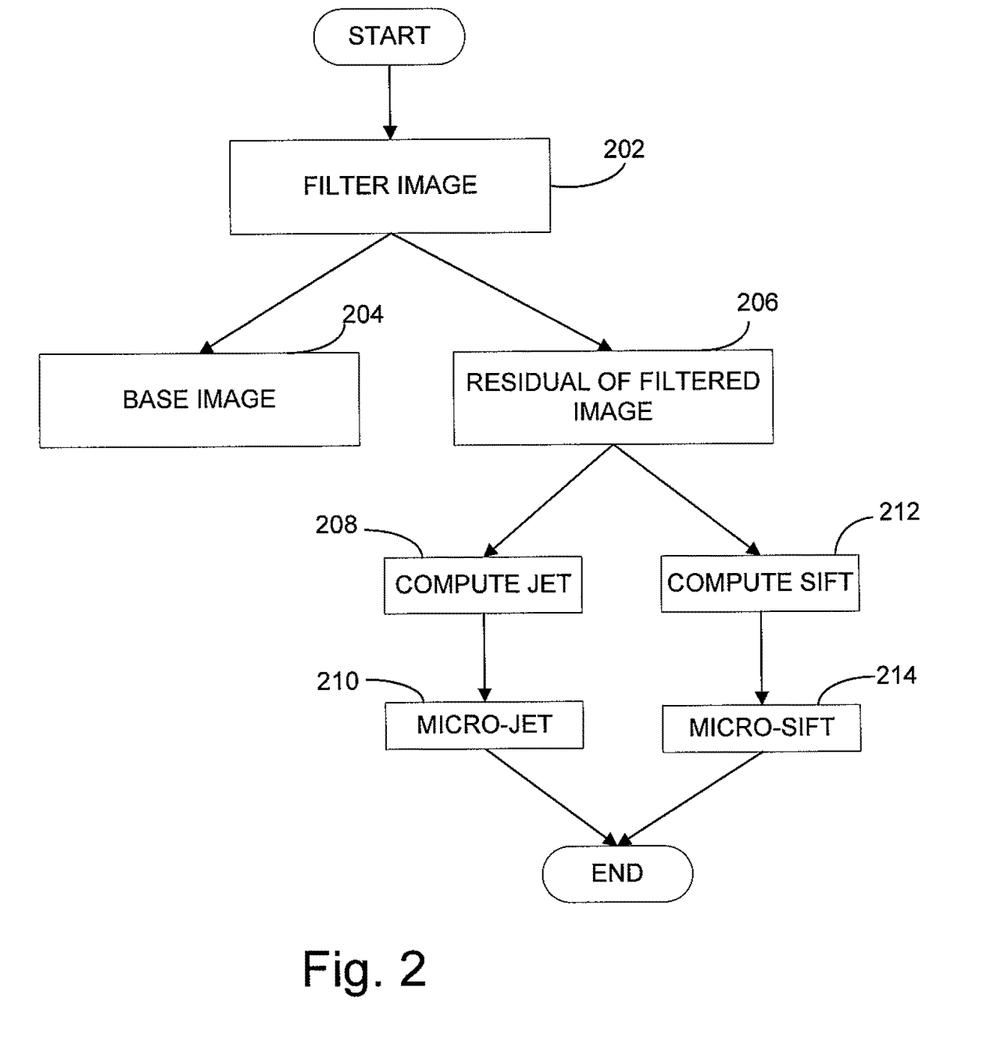
FIG. 2 is a flowchart illustrating the calculation of two novel texture-based mid-level features in accordance with some embodiments of the invention.

As illustrated in FIG. 2, the input image is filtered in act 202 to produce a base image 204 and a residual image 206 which includes the local texture information and is used for further analysis. The residual image 206 may be generated, for example, by subtracting the base image 204 from the original image. The previously-described low-level jet and SIFT texture-based techniques are applied to the residual image 206 in acts 208 and 212, respectively to produce the novel mid-level features micro-jet 210 and micro-SIFT 214. In contrast to the conventional texture-based features produced by using jet and SIFT, the novel micro-texture features micro-jet and micro-SIFT calculated from the residual image 206 may be more sensitive in detecting local variations in pixel intensity that may be important for material recognition in images. In some embodiments, these new micro-texture features micro jet and micro-SIFT are extracted from an image, quantized (e.g., using clustering), and the distribution of the micro-texture feature values in the image are used to assign a material category to the image, as described in more detail below.

Another novel mid-level feature that may be useful in material recognition is related to the shape of objects in an image. Although most materials can be cast into any arbitrary shape, the Applicant has appreciated that the outline shape of a surface of an object and its material characteristics may be related. For example, fabrics and glass tend to have long, curved edges, whereas metals tend to have straight lines and sharp corners. One technique for capturing the outline shape of objects in an image is to use an edge map created using one or more edge detection algorithms which emphasize discontinuities in intensity in the image. Any suitable edge detection algorithm may be used to generate an edge map and embodiments of the invention are not limited in this respect. For example, a Canny edge detector, which uses first-order derivatives of Gaussians, may be applied to an input image to generate an edge map, although other edge detectors may also be used.

Figure 3:
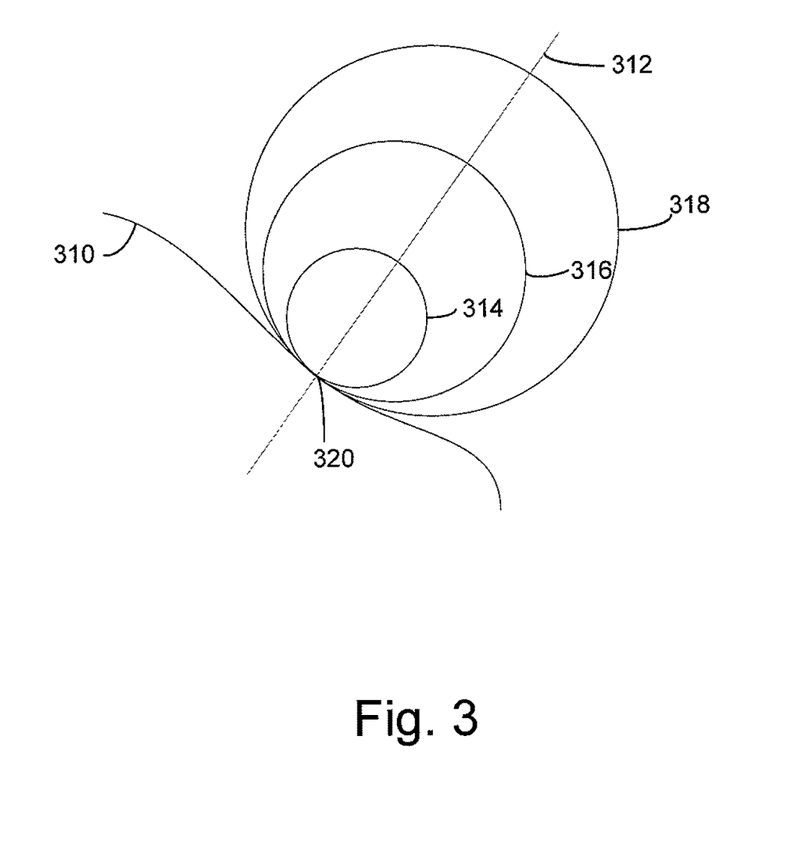
FIG. 3 is a diagram illustrating a novel shape-based mid-level feature in accordance with some embodiments of the invention.

A novel mid-level feature called "curvature" may be extracted by operating on an edge map as illustrated in FIG. 3. Although FIG. 3 shows a technique for determining curvature at a single point 320 on a single edge 310, it should be appreciated that curvature may be determined for multiple points on multiple edges in an image resulting in a distribution of the curvature feature for a portion or the entire image for material classification. In some embodiments, the curvature for edge 310 in an edge map may be determined by defining a direction 312 normal to a point 320 along edge 310. Curvature of the edge 310 at the point 320 may then be characterized by measuring the curvature at point 320 at multiple scales. In the example of FIG. 3, curvature at point 320 is measured at three different scales 314, 316, and 318, and the resulting curvature feature at point 320 may be represented as a three-component vector including values at the three different scales. In some embodiments, the edge map used for deriving the curvature feature may be calculated from a bilaterally-filtered version of the input image rather than being computed directly from the input image. Since bilateral filtering removes some of the local texture information, the resulting edge map may be cleaner because some of the details in the input image are removed after bilateral filtering. As described above, multiple curvature measurements may be made for different points and edges in an edge map of an image and the resulting collection of extracted curvature values may represent the novel mid-level feature of curvature that may be used for material recognition.

As described above, conventional material recognition techniques rely on a reflectance-based measure such as BRDF in which multiple measurements of an object are made or a set of photographs are considered. However, the Applicant has recognized that estimating BRDF is not possible when performing material recognition of objects in a single image without the use of restrictive assumptions. Accordingly, some embodiments of the invention are directed to extracting novel mid-level features from an image that correspond to local reflectance changes along edges in the image.

Glossiness and transparency may be important cues for material recognition. For example, metals tend to be shiny, whereas wooden surfaces tend to be dull and glass and water tend to be translucent, whereas stone tends to be opaque. The Applicant has appreciated that these reflectance properties may manifest as distinctive intensity changes at edges in an image. That is, defining features which characterize how reflectance properties change along edges in an image may be useful in material recognition. Accordingly, two novel mid-level features called "edge slice" and "edge ribbon," which describe reflectance variations along edges in an image are described below with reference to FIG. 4.

Both the edge slice feature and the edge ribbon feature described below with reference to FIGS. 4A and 4B, employ histogram of oriented gradients (HOG) calculations for groups of pixels adjacent to one or more edges in an edge map of an input image. An HOG calculated for a localized region of an image describes the distribution of intensity gradients for pixels within the localized region of an image. For example, an HOG may be calculated over a 4×4 pixel patch of an image. A gradient, which is a two-dimensional vector, is determined for each of the sixteen pixels in the patch, and the distribution of gradient orientations in the patch represents the HOG of the patch.

Figure 4A:
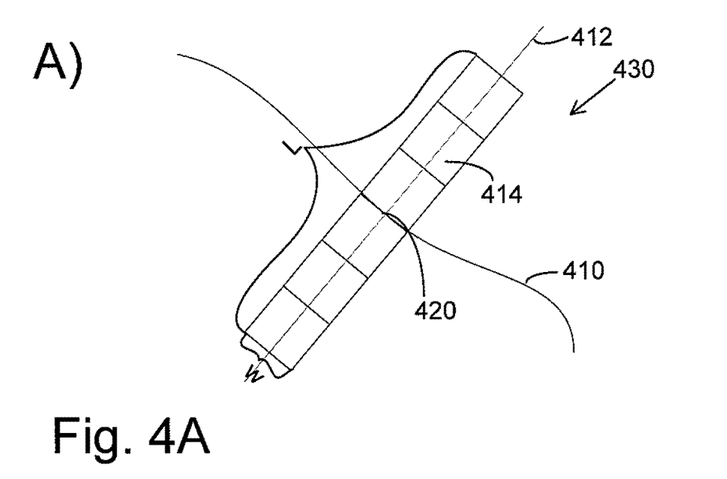
FIGS. 4A and 4B are diagrams illustrating novel reflectance-based mid-level features in accordance with some embodiments of the invention.

A first reflectance-based feature called "edge slice" measures reflectance variations in a group of pixels oriented normal to a point on an edge in a edge map of an image as shown schematically in FIG. 4A. An edge map of an input image may be generated using any suitable technique including, but not limited to, the edge-detection techniques described above. An edge slice value may be calculated for point 420 located on edge 410 by defining a slice 430 of pixels having a width W and a length L oriented along a direction 412 normal to the point 420 on the edge 410. The gradient at each pixel in the slice 430 may be determined and the slice may be divided into a plurality of cells 414. In the example shown in FIG. 4A, the slice 430 has been divided into six cells 414, although slice 430 may be divided into any number of cells and embodiments of the invention are not limited in this manner. The HOG in each of the cells 414 may be determined based on the gradients of pixels in each of the cells 414 to characterize the distribution of gradient orientations in the cell 414. In some embodiments, the oriented gradients may be quantized into a fixed number (e.g., twelve) of "angular bins", and each edge slice in the image may be assigned a quantized value based on the mapping between the content in the edge slice and each of the fixed number of angular bins.

Figure 4B:
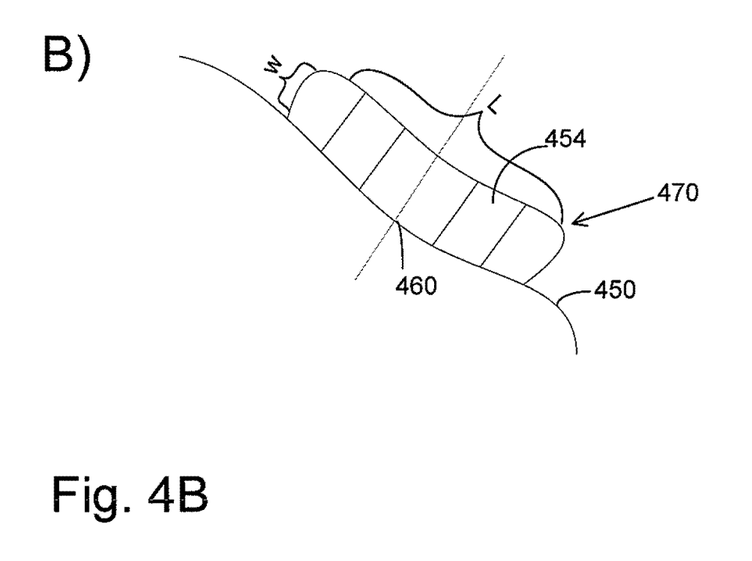

A second reflectance-based feature called "edge ribbon" measures reflectance variations in a group of pixels oriented along an edge in an edge-map of an image as shown schematically in FIG. 4B. A edge ribbon value may be calculated for point 460 located on edge 450 by defining a slice 470 of pixels having a width W and a length L oriented along a direction tangent to the edge 450. The gradient at each pixel in the slice 470 may be determined and the slice may be divided into a plurality of cells 454. In the example shown in FIG. 5A, the slice 470 has been divided into six cells 454, although slice 470 may be divided into any number of cells and embodiments of the invention are not limited in this manner. The HOG in each of the cells 454 may be based on the gradients of pixels in each of the cells 454 to characterize the distribution of gradient orientations in the cell 454. In some embodiments, the oriented gradients may be quantized into a fixed number (e.g., twelve) of angular bins, and each edge ribbon slice in the image may be assigned a quantized value based on the mapping between the content in the edge ribbon slice and each of the fixed number of angular bins.

Figure 5:
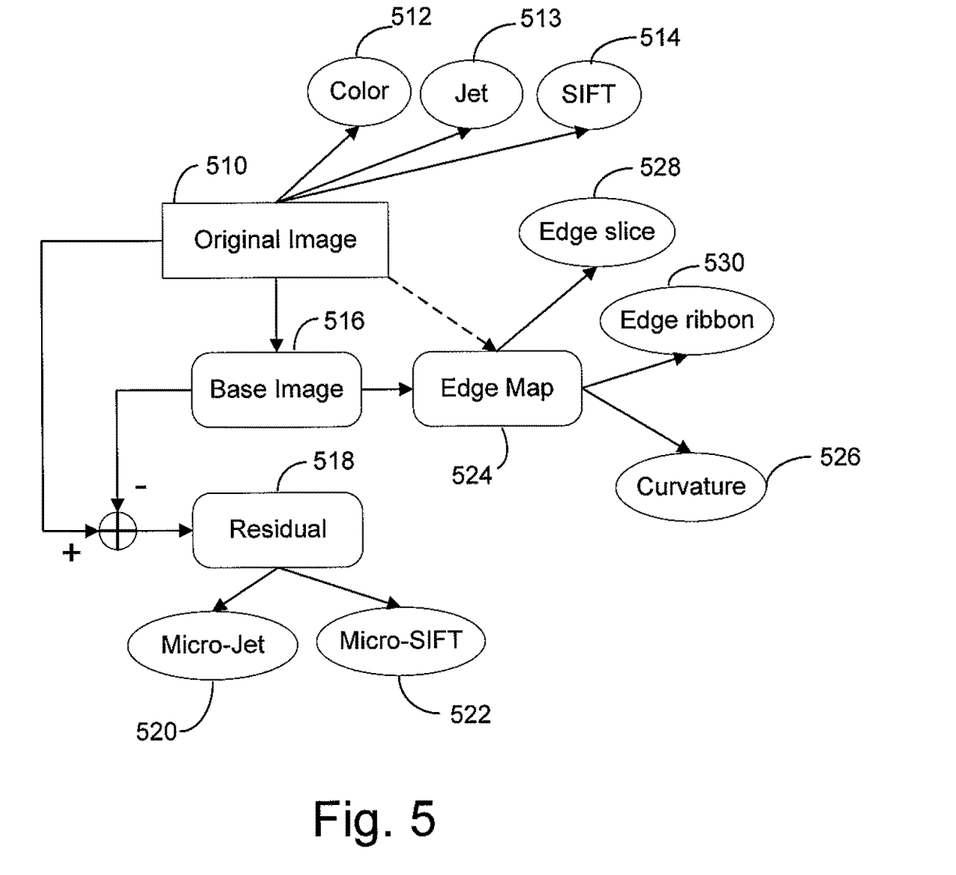
FIG. 5 is a high-level block diagram illustrating extraction of features from an image in accordance with some embodiments of the invention.

Some or all of the aforementioned features (including previously-defined low-level features color and texture (jet and SIFT), and novel mid-level features micro-jet, micro-SIFT, curvature, edge slice, and edge ribbon) may be useful for material recognition of an object in an image. A flowchart indicating how each of these features may be generated from an original image input into a processing system configured to perform material recognition in accordance with some embodiments of the invention is shown in FIG. 5.

A plurality of low-level features including, but not limited to, color 512, jet 513, and SIFT 514 may be directly calculated from original image 510. However, the novel mid-level features disclosed herein may not be calculated directly from original image 510, but may be calculated from a transformed version of original image 510. For example, original image 510 may be filtered (e.g., with bilateral filtering) to produce base image 516. Residual image 518 may be calculated by subtracting base image 516 from original image 510. The novel mid-level texture-based features micro-jet 520 and micro-SIFT 522 may then be calculated from residual 518 by applying jet and SIFT techniques to the residual image 518. An edge detector (e.g., Canny edge detector) may be used to generate edge map 524 either directly from original image 510 (as indicated by the dashed arrow in FIG. 5) or preferably from base image 516 in which some of the local texture information has been removed. The novel mid-level shape feature curvature 526 and the novel mid-level reflectance-based features edge slice 528 and edge ribbon may then be calculated from edge map 524 as described above.

Some combination of these non-reflectance based and reflectance-based features may be used to classify the material in an image. In particular, at least one processor in a computer may be programmed with a classifier based on a combination of these features to facilitate material recognition from an image. Techniques for determining which individual and/or combination of the aforementioned features provide the most salient information for material recognition is now described. In accordance with some embodiments of the invention, a Bayesian computational framework is used to select a combination of features for material recognition.

As described earlier with reference to FIG. 1, prior to using pattern recognition to categorize an image as belonging to a material category, the features that are extracted from the input image may be quantized into a document model (e.g., in act 114 of FIG. 1). In some embodiments, a k-means clustering algorithm may be used to cluster the instances of each feature to form a dictionary and to map the image feature into visual words (also called "codewords"). However, it should be appreciated that any suitable quantization technique may alternatively be used and embodiments of the invention are not limited to using a k-means clustering algorithm.

In accordance with one implementation, in which there are m features and m corresponding dictionaries (i.e., one dictionary $\{D_i\}_{i=1}^m$ generated for each feature), with each dictionary comprising $V_i$ codewords (i.e., $|D_i|=V_i$), each feature may be quantized separately. In such a case, the words generated by the ith feature are $\{w_1^{(i)}, \ldots, w_{N_i}^{(i)}\}$, where each word $w_j^{(i)}$ is an element in the set of codewords $\{1, 2, \ldots, V_i\}$ and $N_i$ is the number of words.

To simultaneously consider the contribution of multiple features in material recognition, documents comprising codewords and their corresponding dictionaries for different features may be combined. In one implementation, a document of m sets of words (i.e., one set of words per feature) $\{w_1^{(1)}, \ldots, w_{N_1}^{(1)}\}, \{w_1^{(2)}, \ldots, w_{N_2}^{(2)}\}, \ldots, \{w_1^{(m)}, \ldots, w_{N_m}^{(m)}\}$ may be augmented to form one set $$\left\{w_1^{(1)}, \ldots, w_{N_1}^{(1)} + V_1, \ldots, w_{N_2}^{(2)} + V_1, \ldots, w_1^{(m)} + \sum_{i=1}^{m-1} V_i, \ldots, w_{N_m}^{(m)} + \sum_{i=1}^{m-1} V_i\right\},$$

with a joint dictionary being the mathematical union of the dictionaries $$D = \bigcup_i D_i, |D| = \sum_{i=1}^{m-1} V_i.$$

After combining multiple documents for different features into a single document model (e.g., a bag-of-words model), pattern recognition may be used to assign a material category to an image by comparing the combined document model to one or more pre-stored or "learned" distributions of features using a classifier algorithm such as a nearest neighbor algorithm and/or by using a Bayesian model.

Figure 6:
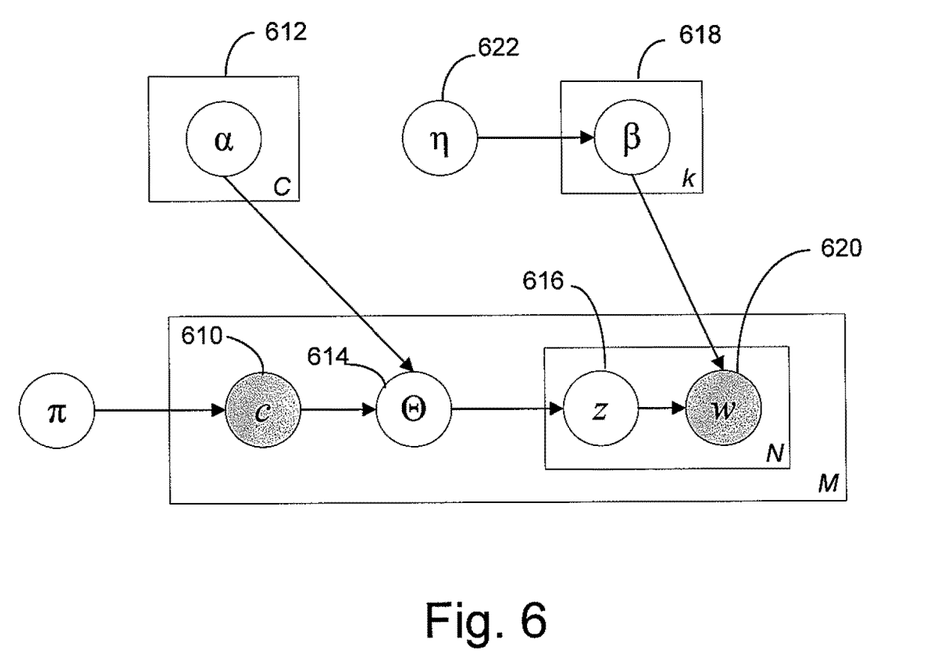
FIG. 6 is a graphical representation of a Latent Dirichlet Allocation (LDA) algorithm used for material recognition in accordance with some embodiments of the invention.

A Bayesian approach to model the hierarchical structure of words in a bag-of-words model is Latent Dirichlet Allocation (LDA). For exemplary purposes only, LDA is briefly described in the context of material recognition. As shown in the graphical model of LDA shown in FIG. 6, a material category c~Mult(c|π) 610, where Mult(·|π) is a multinomial distribution with parameter π may be defined. A hyper-parameter $\alpha_c$ 612 may be selected based on the material category c, and a multimodal distribution θ~Dir(θ|$\alpha_c$) 614 may be determined based on $\alpha_c$, where Dir(·|$\alpha_c$) is a Dirichlet distribution with parameter $\alpha_c$ and has the following property:

$$\sum_{i=1}^{k} \theta_i = 1,$$

where k is the number of elements in θ. From the multimodal distribution θ, a series of topics $z_n$~Mult(z|θ), n=1 ..., N may be drawn. Each topic $z_n$(=1, ..., k) 616 selects a multinomial distribution $\beta_{z_n}$ 618 from which a word $w_n$~Mult($w_n$|$\beta_{z_n}$) 620 is drawn, where each word $w_n$ corresponds to a quantization cluster (e.g., a prototype) of the features. To account for insufficient data in some training sets, a conjugate prior η 622 may be imposed upon β.

Because computing the log likelihood log p(w|$\alpha_c$, η) may be complex to compute an alternative approach that may be used in some embodiments may be to maximize the lower bound L($\alpha_c$, η) estimated through the variational distributions over θ, {$z_d$}, β. Once $\alpha_c$ and η have been learned, Bayesian MAP criterion may be used to choose the material category according to $$c^* = \underset{c}{\operatorname{argmax}} L(\alpha_c, \eta) + \lambda_c \text{ where } \lambda_c = \log \pi_c.$$

Figure 7:
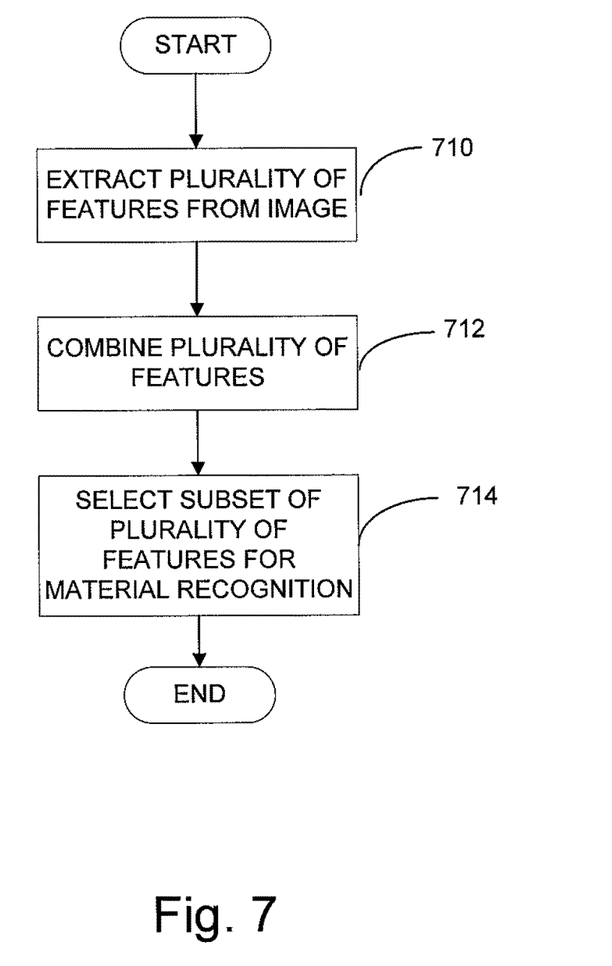
FIG. 7 is a flowchart representing a process for selecting a subset of features for material recognition in accordance with some embodiments of the invention.

The Applicant has recognized that, in some instances a model that includes all of the aforementioned low- and mid-level features may not always result in a model with a high material recognition rate. The inventor theorizes that when the number of items in a training set is limited, this may occur because, as more features are included in the model, the likelihood that the model overfits the training data is increased, thereby decreasing the performance of the material recognition system when used to classify images. A high-level flowchart for selection of features for material recognition in accordance with some embodiments of the invention is shown in FIG. 7. In act 710, a plurality of features are extracted from an image. The plurality of extracted features may include some or all of the low- and mid-level features described above. The plurality of extracted features may also include other features not described herein, but that may be useful for material recognition and embodiments of the invention are not limited in this respect. In act 712, the plurality of features are combined in any suitable manner that facilitates an analysis of each of the features' contributions to successful material recognition of objects in images. For example, in the augmented LDA algorithm described below in connection with FIG. 8, dictionaries for multiple extracted features are combined into a joint dictionary and the joint dictionary is used to train an LDA model to learn material categories. In act 714, a subset of the extracted features are selected based on one or more analyses of the one or more combinations of the plurality of features extracted in act 710.

Figure 8:
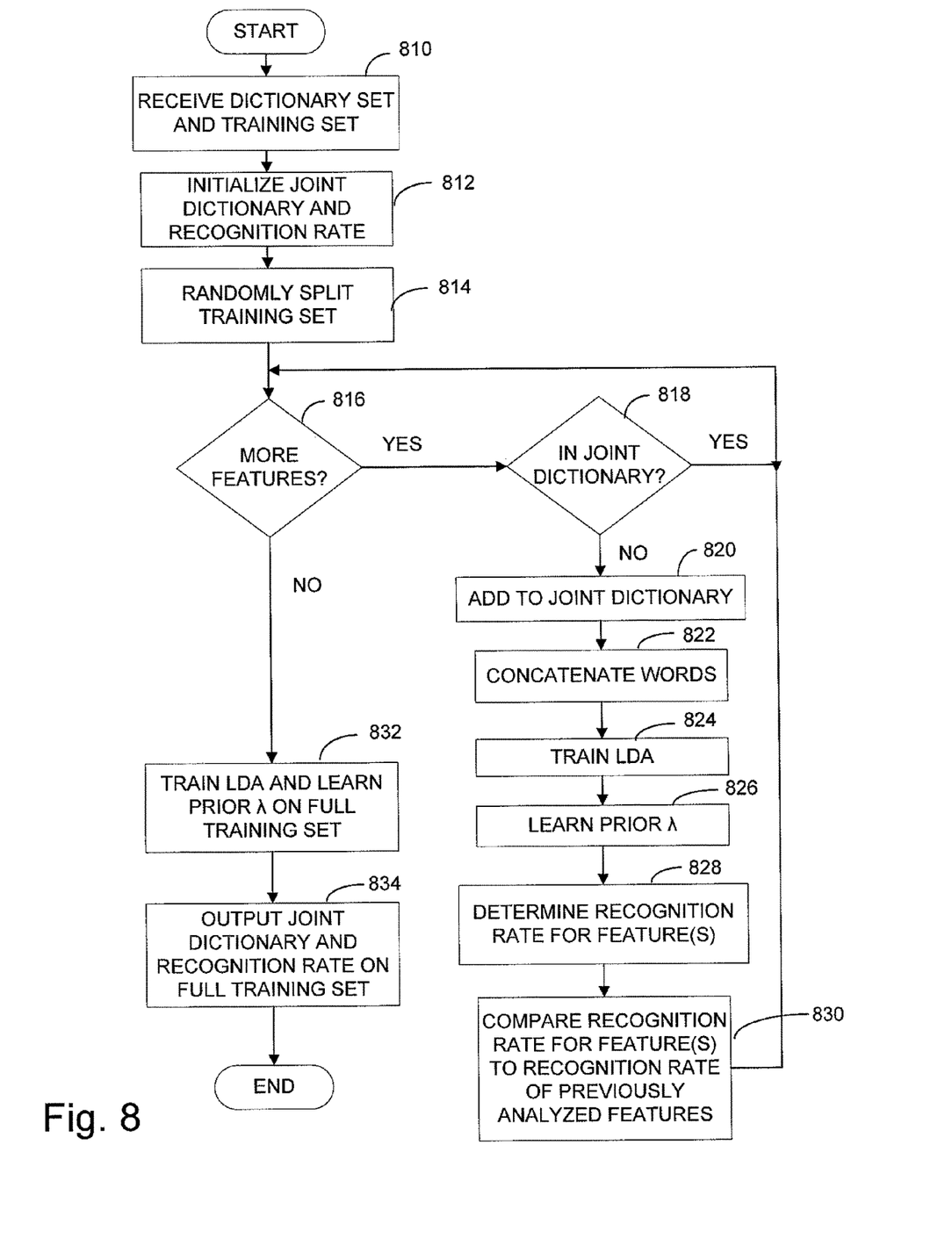
FIG. 8 is a flowchart representing a feature selection process using an augmented LDA algorithm in accordance with some embodiments of the invention.

An exemplary technique for selecting a subset of features for material recognition in accordance with some embodiments of the invention is illustrated in FIG. 8. The exemplary method of FIG. 8 is an augmented LDA greedy algorithm that selects features, one at a time, that maximize the recognition rate on an evaluation set of images. Additional features are added until adding more features decreases the recognition rate. A greedy algorithm is a technique that selects locally optimal solutions in a stepwise manner Although FIG. 8 is described with reference to a greedy algorithm for selecting features for material recognition, it should be appreciated that other feature selection techniques are also possible and embodiments of the invention are not limited in this respect.

The exemplary augmented LDA algorithm illustrated in FIG. 8 is now described in more detail. In act 810 a set of dictionaries {$D_1$, ..., $D_m$} corresponding to m features and a training set of images are received. For example, an exemplary input training set may be the Flickr Materials Database described in Sharon et al. *Material perception: What can you see in a brief glance? [Abstract]. Journal of Vision,* 9(8): 784, 2009, which includes ten material categories (fabric, foliage, glass, leather, metal, paper, plastic, stone, water, and wood) and 100 images per material category c. In one implementation, 50 images per material category may be used for training with the other 50 images per material category being used for testing the trained model. Though, it should be appreciated that any suitable data set and number of material categories may alternatively be used and embodiments are not limited in this respect.

In act 812, a joint dictionary D and a recognition rate r are initialized and the training set of images received in act 810 is randomly divided into two sets in act 814; a first set L is used to train the LDA model and a second set E is used as an evaluation set to determine the recognition rate for a particular combination of selected features.

In acts 816-830, the dictionaries $D_i$ received in act 810 are incrementally added to the joint dictionary D, the LDA model is trained for each material category c using the first set L, and a recognition rate for the trained model is determined using the evaluation set E. For example, in a first iteration, the recognition rate for each of the m features may first be determined and the feature with the highest recognition rate may be selected. Then additional features may be added incrementally in further iterations by combining their dictionaries as described above and it may be determined whether the recognition rate has increased or decreased.

A more detailed description of the learning and evaluation technique illustrated in acts 816-830 is now described. In act 816 it is determined whether there are additional features that have not yet been processed. If there are additional features, one of these features is selected and it is determined in act 818 if the corresponding dictionary $D_i$ for the selected feature is included in the joint dictionary D. If the corresponding dictionary $D_i$ is included in the joint dictionary D, processing returns to act 816. However, if the dictionary $D_i$ is not included in the joint dictionary D, the dictionary $D_i$ is added to joint dictionary D in act 820, and the words are concatenated in act 822 into a combined dictionary D'=D∪{$D_i$} in accordance with the dictionary concatenation procedure described above. In act 824, the LDA model is trained for each of the material categories in the partial training set L using the combined dictionary D'.

A uniform distribution may be assumed for the prior $\lambda_c$ (i.e., each material category will appear equally). However, since the LDA model is learned for each category independently, the learning procedure may not converge in a finite number of iterations. Thus, in order to ground the probability density functions for a fair comparison, in act 826, the prior $\lambda_c$ is learned using an iterative procedure that maximizes the recognition rate (or minimizes the error). After the LDA model has been trained for each material category c, the recognition rate $r_i$ for the trained model is tested by evaluating the evaluation set of images E in act 728 using Bayesian MAP criterion in accordance with the equation $$c^* = \underset{c}{\operatorname{argmax}} L(\alpha_c, \eta) + \lambda_c$$

described above.

In act 830, the recognition rate $r_i$ for the dictionary $D_i$ is compared to a maximum recognition rate r determined from a previously analyzed dictionary, and if the recognition rate $r_i$ exceeds the previous maximum recognition rate r, the recognition rate $r_i$ becomes the new r and the corresponding feature (or combination of features) is determined to have the highest evaluation rate of the features then analyzed. The process then returns to act 816 where it is determined whether any unanalyzed features (and their corresponding dictionaries) remain. If it is determined in act 816 that no additional features remain, the process proceeds to act 832 where the LDA model is trained and the prior λ is learned on the entire training set received in act 810. In one implementation, the number of topics z used in act 834 to train the LDA model may be varied from 50 to 250 with a step size of 50, and the trained LDA model having the highest recognition rate r may be selected. The joint dictionary D and the recognition rate r are then output in act 834 and the exemplary feature selection process ends.

It should be appreciated that although a particular example describing a Bayesian classification framework has been described with reference to FIG. 8, that any suitable pattern recognition algorithm and/or classifier may alternatively be used for material recognition including, but not limited to, nearest neighbor classifiers, support vector machines, and boosting algorithms.

Figure 9:
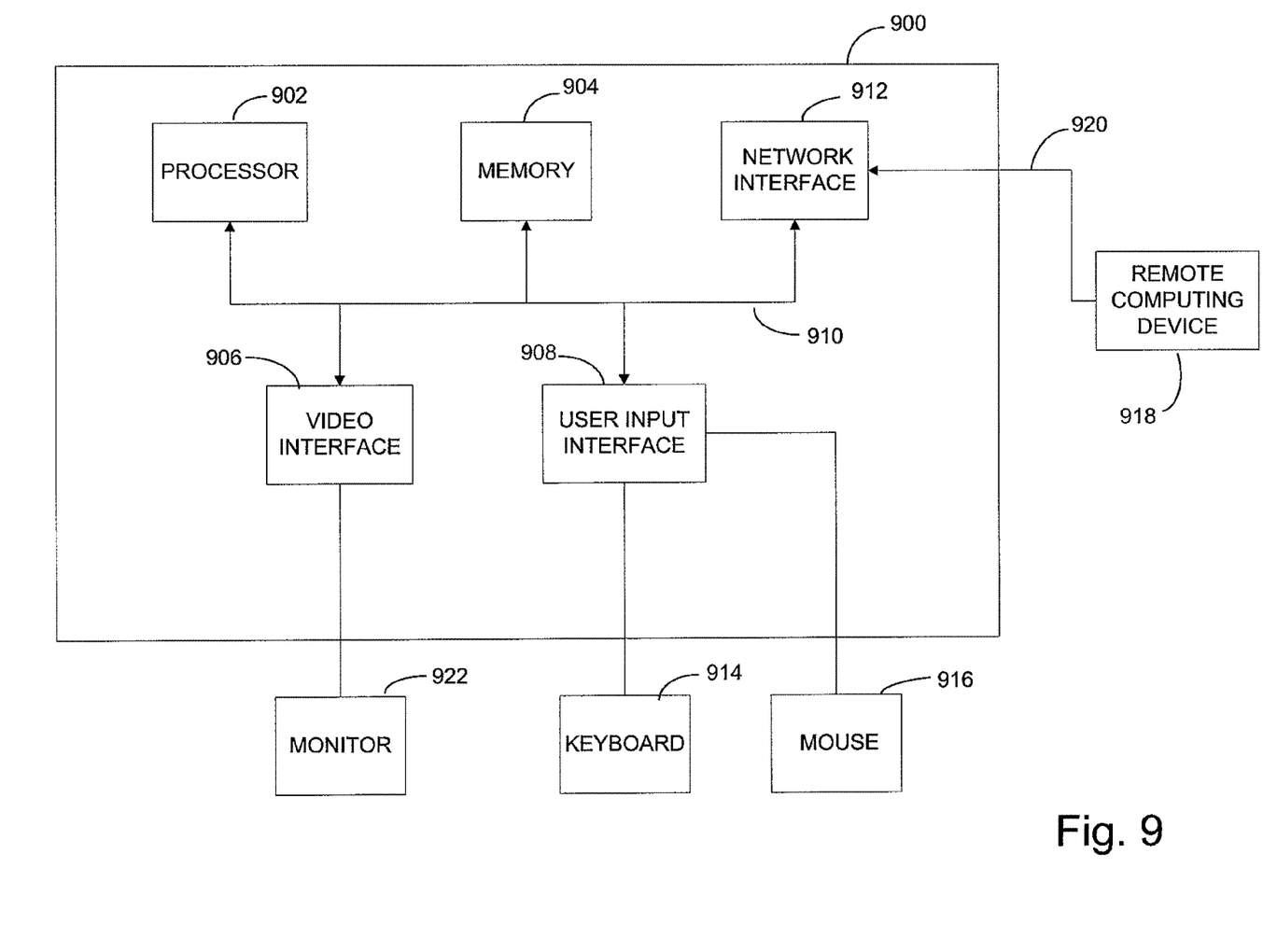
FIG. 9 is a block diagram of a computer system on which some embodiments of the invention may be implemented.

FIG. 9 shows a schematic block diagram of an illustrative computer 900 on which aspects of the invention may be implemented. Only illustrative portions of the computer 900 are identified for purposes of clarity and not to limit aspects of the invention in any way. For example, the computer 900 may include one or more additional volatile or non-volatile memories, one or more additional processors, any other user input devices, and any suitable software or other instructions that may be executed by the computer 900 so as to perform the function described herein.

In the illustrative embodiment, the computer 900 includes a system bus 910, to allow communication between a central processing unit 902, a memory 904, a video interface 906, a user input interface 908, and a network interface 912. The network interface 912 may be connected via network connection 920 to at least one remote computing device 918. Peripherals such as a monitor 922, a keyboard 914, and a mouse 916, in addition to other user input/output devices may also be included in the computer system, as the invention is not limited in this respect.

In some embodiments, one or more techniques for material recognition disclosed herein may be performed by one or more processors included in the same or different computer including, but not limited to computer 900. For example, the method illustrated in FIG. 8 for selecting a subset of features for material recognition may be executed on different processor than the method illustrated in FIG. 5 for extracting features from an input image. Additionally, in embodiments where multiple processors are used, the results of one method (e.g., feature extraction in FIG. 5) performed by a first processor may be transmitted to a second processor to perform a second method (e.g., feature selection in FIG. 8) using any suitable technique including, but not limited to, transmitting the results across a wired or wireless network, storing the results in a shared database, and physically transferring the results to a second computer on a tangible computer-readable medium.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including Personal Digital Assistant (FDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method implemented by at least one computer processing device, the method comprising:
   extracting a plurality of features from an image;
   combining at least two of the plurality of features to generate a model comprising distributions for the at least two of the plurality of features across groups of pixels in the image, wherein the at least two of the plurality of features include one or more mid-level features; and
   categorizing a material of an object in the image based, at least in part, on the distributions in the model,
   wherein an individual mid-level feature is a texture-based feature that is not reflectance-based.

2. The method of claim 1, wherein the at least two of the plurality of features comprise a reflectance-based edge slice feature representing image changes along a direction normal to at least one edge in the image.

3. The method of claim 2, wherein the image changes comprise changes in a distribution of gradient orientations determined for an individual group of pixels oriented normal to the at least one edge.

4. The method of claim 1, wherein combining at least two of the plurality of features comprises:
   selecting the at least two of the plurality of features to combine based, at least in part, on a trained model in which combinations of features are analyzed to determine the at least two of the plurality of features.

5. The method of claim 1, wherein the at least two of the plurality of features used to generate the model are less than all of the plurality of features extracted from the image.

6. A hardware computer-readable storage medium storing a plurality of instructions that, when executed by a computer processing device, cause the computer processing device to perform acts comprising:
   extracting at least one reflectance-based feature and at least one non-reflectance based feature from an image; and
   categorizing a material in the image based, at least in part, on the at least one reflectance-based feature and the at least one non-reflectance based feature,
   wherein the at least one reflectance-based feature is associated with image changes relative to at least one edge in the image and comprises:
      an edge slice feature representing the image changes along a direction normal to the at least one edge in the image, or
      an edge ribbon feature that describes the image changes along another direction tangent to the at least one edge of the image.

7. The hardware computer-readable storage medium of claim 6, wherein the at least one reflectance-based feature comprises the edge slice feature.

8. The hardware computer-readable storage medium of claim 6, wherein the at least one reflectance-based feature comprises the edge ribbon feature.

9. The hardware computer-readable storage medium of claim 6, wherein the at least one non-reflectance based feature is a texture-based feature.

10. The hardware computer-readable storage medium of claim 6, the acts further comprising:
    combining a first dictionary created for the at least one reflectance-based feature and a second dictionary created for the at least one non-reflectance based feature to generate a joint dictionary; and
    training a bag-of-words model using the joint dictionary, wherein the material in the image is categorized based, at least in part, on the trained bag-of-words model.

11. The method of claim 1, wherein the texture-based feature is extracted from a filtered version of the image.

12. The method of claim 1, wherein the texture-based feature is a micro-jet feature obtained using a residual image.

13. The method of claim 1, wherein the texture-based feature is a micro-SIFT (scale-invariant feature transform) obtained using a residual image.

14. A system comprising:
   logic configured to:
      extract at least two features from an image,
      combine the at least two features to generate a model comprising distributions for the at least two features across groups of pixels in the image, wherein an individual one of the at least two features describes reflectance variations along edges in the image, and
      categorize a material of an object in the image based, at least in part, on the distributions in the model; and
   one or more processing devices configured to execute the logic.

15. The system of claim 14, wherein the individual feature describes a reflectance property of glossiness or transparency.

\* \* \* \* \*